United States Patent
Moreno

(10) Patent No.: US 7,175,132 B2
(45) Date of Patent: Feb. 13, 2007

(54) MECHANISM FOR ELIMINATING LIMIT CYCLE OSCILLATIONS ON SERVOCONTROLLED AERODYNAMIC CONTROL SURFACES

(75) Inventor: Alvaro Villalta Moreno, Madrid (ES)

(73) Assignee: Airbus Espana, S.L., Madrid (ES)

( * ) Notice: Subject to any disclaimer, the term of this patent is extended or adjusted under 35 U.S.C. 154(b) by 29 days.

(21) Appl. No.: 11/027,834

(22) Filed: Dec. 30, 2004

(65) Prior Publication Data
US 2005/0178897 A1 Aug. 18, 2005

(30) Foreign Application Priority Data
Dec. 31, 2003 (ES) .............................. 200303084

(51) Int. Cl.
- B64C 3/38 (2006.01)
- B64C 5/10 (2006.01)
- B64C 9/00 (2006.01)
- B64C 13/00 (2006.01)

(52) U.S. Cl. .................................. 244/99.13
(58) Field of Classification Search ............. 244/99.13, 244/99.2, 174, 75.1, 87, 88, 99.3, 224
See application file for complete search history.

(56) References Cited

U.S. PATENT DOCUMENTS 2,254,473 A * 9/1941 De Bell ................... 244/99.13
2,471,857 A * 5/1949 Bleakney et al. ........ 244/99.13

OTHER PUBLICATIONS

Design of Machinery, 2nd ed, new media version, by R. Norton, McGraw-Hill, 1999. Fig. 8-39.*
http://web.archive.org/web/20031226144555/www.engr.colostate.edu/~dga/me324/index.html (useful figures from the book link).*

* cited by examiner

Primary Examiner—Teri Pham Luu
Assistant Examiner—Edward J. Mayle
(74) Attorney, Agent, or Firm—Klauber & Jackson

(57) ABSTRACT

Servocontrolled aerodynamic control surfaces, such as the direction rudder (1) of an airplane, are equipped with servoactuators (5). The bearing supports (3) of the rotation axis (2) or hinged axis give rise to the formation of free play for the manufacturing tolerances, that will be more pronounced with the wear of the bearings or joint elements.

The mechanism (8) in question includes an elastic element (10) fixed to the structure (4) wherein the control surface (1) is jointed, connected rigidly to an articulated connecting rod (12) having a following roller (13) of a cam (9) integral to the control surface (1). The cam (9) profile produces a continuous nonlinear, angular deformation, of the elastic element in order to determine a force torque on the control surface (1) that is maximum in the neutral position of the control surface and manages to be eliminated in the extreme side deviations.

5 Claims, 4 Drawing Sheets

MECHANISM FOR ELIMINATING LIMIT CYCLE OSCILLATIONS ON SERVOCONTROLLED AERODYNAMIC CONTROL SURFACES

OBJECT OF THE INVENTION

As expressed in the title of this specification, the present invention, refers to a mechanism for eliminating limit cycle oscillations on servocontrolled aerodynamic control services, which provides outstanding relevant and advantageous characteristics over other devices used nowadays for the same purpose.

These aerodynamic surfaces are hinged or generally jointed to a fixed structure and the rotation thereof controlled by the pilot or by automatic flight control systems, produces momenta and aerodynamic forces that stabilize and control the spacecraft, such as depth rudders, direction rudders and ailerons.

Aerodynamic control surfaces are prone to endure dynamic instability in flight. These are some of the factors that contribute to producing said dynamic instability in flight:

Optimization of the weight of the control surfaces and primary surfaces to which they are connected, whose results are lighter and less rigid structures.

Flight speed: the increase of the flight speed increases the tendency for instability.

Size of the control surface: The larger the control surface, the greater the tendency for dynamic instability due to greater inertia. These contributing factors have become obvious during the creation of very big and new generation airships.

Servoactuators and servoactuator supports: their rigidity is a fundamental element when stabilizing the dynamics of the control surfaces. However, the balance between rigidity and inertia worsens as the size of the control surface increases.

Free play in the connections of the servoactuators and on the control surface that support the hinge axis or line of hinges.

There should not be dynamic instability on the aerodynamic control surfaces under normal conditions nor even when there are failures. The probability that instability is produced should be lower than that specified in the regulations or applicable and suitable requirements for safe operation of the spacecraft. As we have indicated above, in modern airplanes with servocontrolled control surfaces, the servoactuators play a crucial role in dynamic stability.

However, it frequently happens that a dynamically stable control surface equipped with servoactuators becomes dynamically instable if the servoactuators do not operate. Given that the supports of the line of hinges of the control surface and the servoactuators will be exposed to the free play as a result of the manufacturing tolerances and the wear of the bearings and similar joint elements that facilitate rotation of the control surface, the natural tendency is that the control surface is dynamically instable, the range of oscillations is somewhat higher than the free play existing in the joints. This dynamic instability leads to the phenomenon normally known as limit cyclical oscillations of the control surface, which in turn result in momenta and forces that are transmitted to the airship.

Depending on the range and frequency of these resulting limit cycle oscillations, the vibrations of the airship may disturb the crew and the passengers or, if they are great enough, they jeopardize the safety of the flight. On the other hand, these oscillations, even if they are so small that the crew does not manage to notice them, they will result in an increase of damage due to fatigue and greater wear of the affected parts.

BACKGROUND OF THE INVENTION

Although nowadays great efforts are being made in order to reduce play, it is inevitable that it exists due to wear. To eliminate limit cycle oscillations, costly maintenance that guarantees that the play is kept within some minimums is required. Other types of measures such as balancing the weight of the control surface by adding counterweights, or else, increasing the structural rigidity, which involves disadvantages due to weight, are resorted to.

DESCRIPTION OF THE INVENTION

In broad outline, the mechanism for eliminating limit cycle oscillations on servocontrolled aerodynamic control surfaces, object of the invention, achieve this effect without a need for a greater surface mass balance, greater structural rigidity, or reduced free play of the bearings or joint elements.

The mechanism in question includes an elastic element, such as a spring or torsion bar that is fixed to the structure or stabilizer to which the control surface or rudder is connected. This elastic element has on its active end an articulated connecting rod or radial lever that ends in a roller that remains in this way constantly applying pressure against the profile of a cam that is rigidly connected to the control surface. When the control surface is deflected, the roller produces angular deformation of the elastic element, varying the elastic reaction momentum or force depending on the profile of the cam. In this way, when the control surface is rotated around the hinged axis, the shape of the cam regulates the force torque on the rudder so that:

a) The control surface can rotate around the hinged axis in the range of specified deviations without producing obstruction or limitation of movement.

b) The elastic element causes the following roller of the cam to be continuously in contact with the profile thereof in the complete range of positive and negative deviations of the control surface or rudder.

c) Deformation of the elastic element is not linearly related to the rotation surface, but rather:

deformation thereof is always greater than a specified threshold and is always in the same direction.

The normal pressurized contact force, with which the roller attacks the cam, produces a momentum around the rotation axis that varies nonlinearly when the control surface deviates angularly. The momentum is maximum around the neutral position and reduces until it is eliminated in practical terms for positive and negative angular deviations of the control surfaces, that exceed the specified thresholds, since the profile of the cam in its end areas is concentrically circular to the rotation axis.

In this way, the elastic element loads the control surface with a torque around the line of hinges, which is maximum in the neutral position of the control surface, and then reduces progressively to "0" when the positive and negative deflections of the control surface increase, in the specified manner.

By means of this elastic load, that acts on the control surface aside from the aerodynamic actions, the control surface is forced against the servoactuator reducing in this way the effect of the play of the joint elements on the limit cycle oscillations. Any oscillation may be eliminated according to the invention, with great benefits as for weight, aerodynamic resistance, or cost with regard to known systems, such as the above-mentioned mass balance, increase of rigidity, loads produced by an aerodynamic control surface, or systems based on active servosystems.

In order to provide a better understanding of the characteristics of the invention and forming an integral part of this specification, some sheets of drawings whose figures represent the following in an illustrative and non-restrictive manner, are attached hereto:

DESCRIPTION OF THE PREFERRED EMBODIMENT

Figure 1:
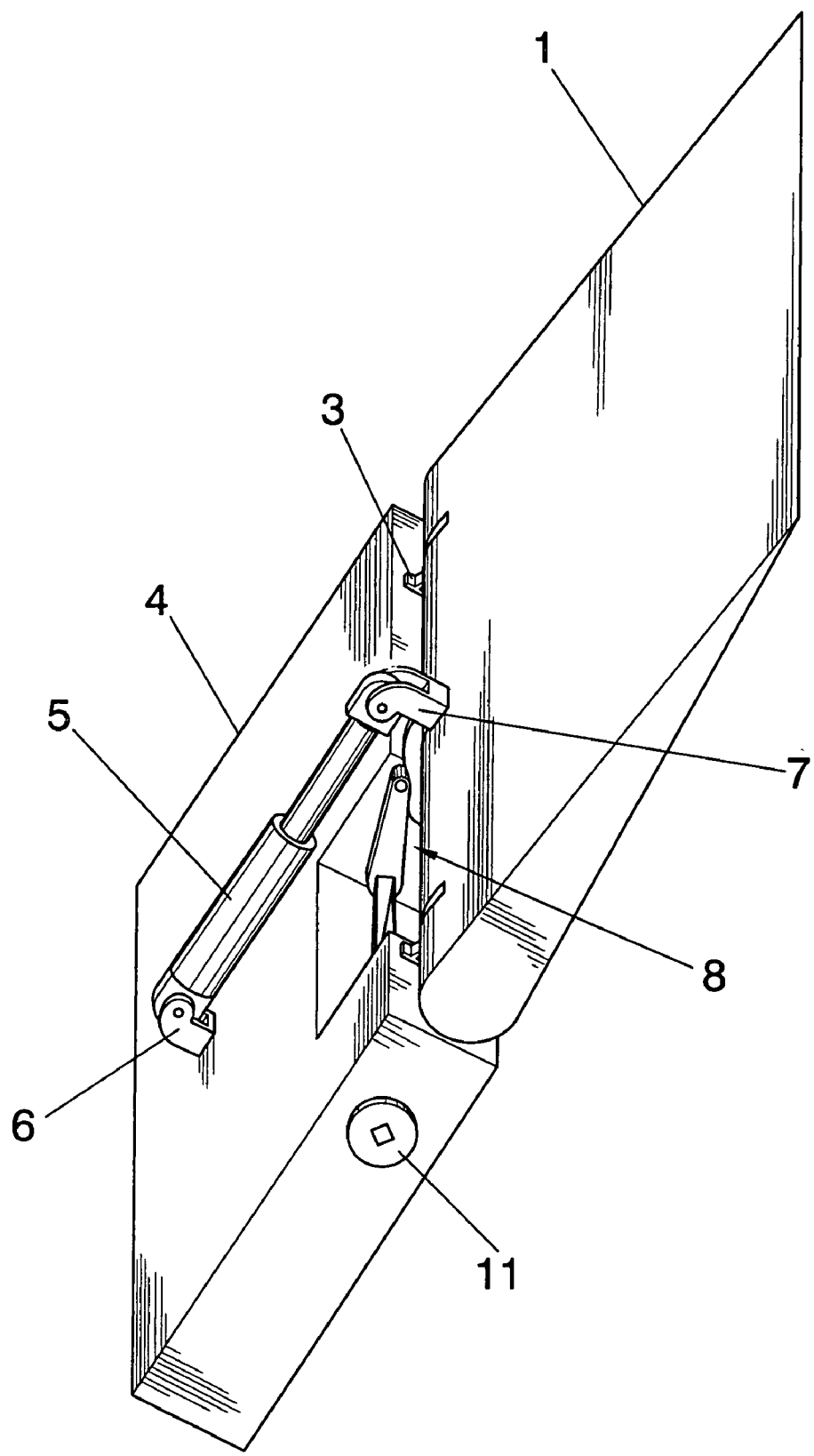
FIG. 1 is a perspective schematic view of the mechanism for eliminating limit cycle oscillations on servocontrolled aerodynamic control surfaces, object of the invention, applied to a rudder aided by a servoactuator connected to a stabilizer of an airplane.

Making reference to the numbering used in the figures, we can see how the mechanism for eliminating limit cycle oscillations on servocontrolled aerodynamic control surfaces, that the invention proposes, is applied in this case to the control of the rudder (1) that joints on the hinged axis line (2), passing through the bearing supports (3) connected to the fixed element or the stabilizer (4) of the airplane.

The rudder (1) is controlled by the actuator (5) anchored between the supports (6) and (7) respectively integral to the stabilizer and the rudder. These anchorings are jointed since they comprise the forked ties.

Figure 2:
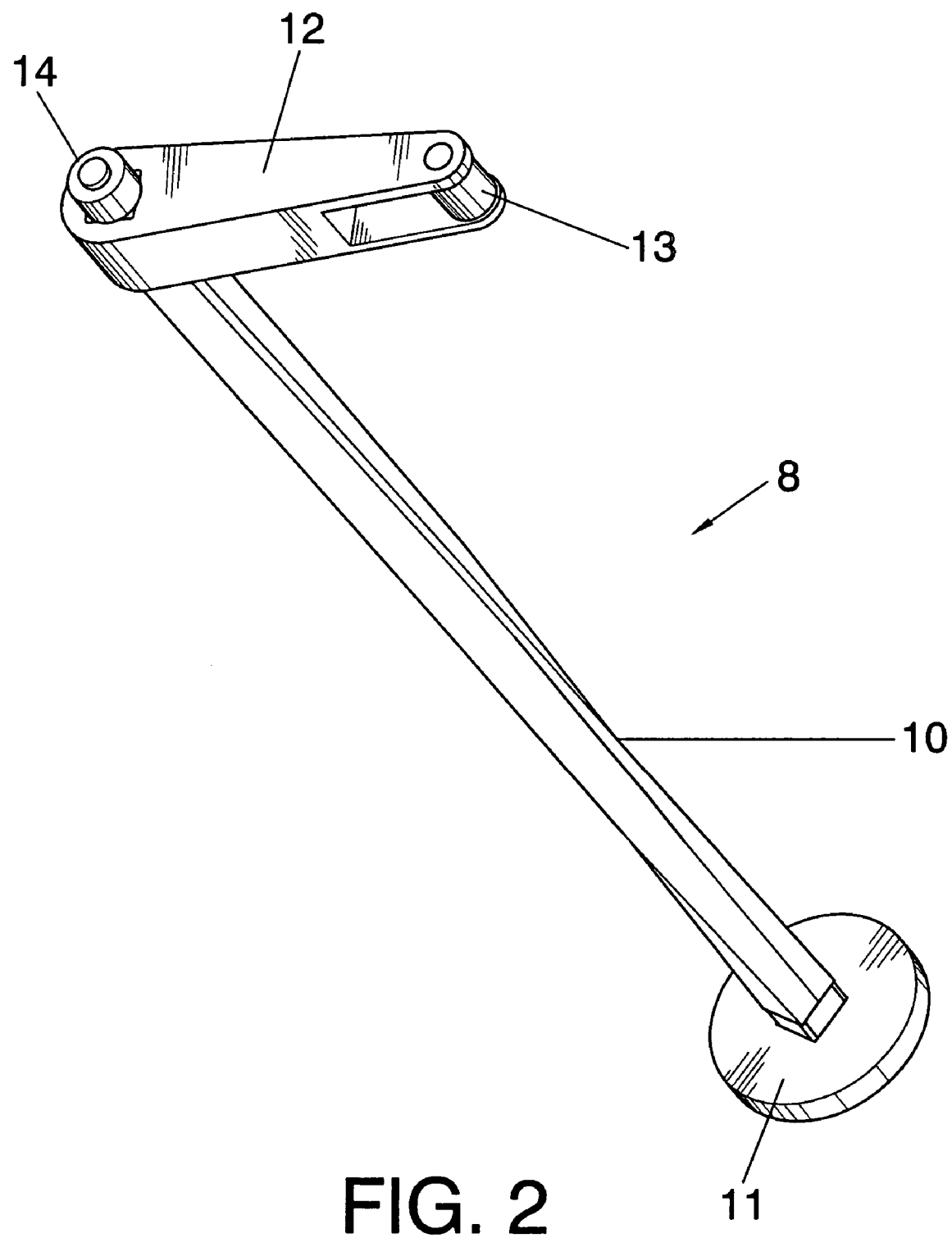
FIG. 2 is a perspective and larger scale view of the same mechanism as in FIG. 1, without including the cam.

The mechanism for eliminating the limit cycle oscillations on this rudder (1) is generally referred to as number (8) and its shape is more clearly seen in FIG. 2. FIG. 1 schematically shows the place where this mechanism that actuates the cam (9) integral to the rudder and arranged perpendicularly to the rotation axis (2), is located.

Figure 3:
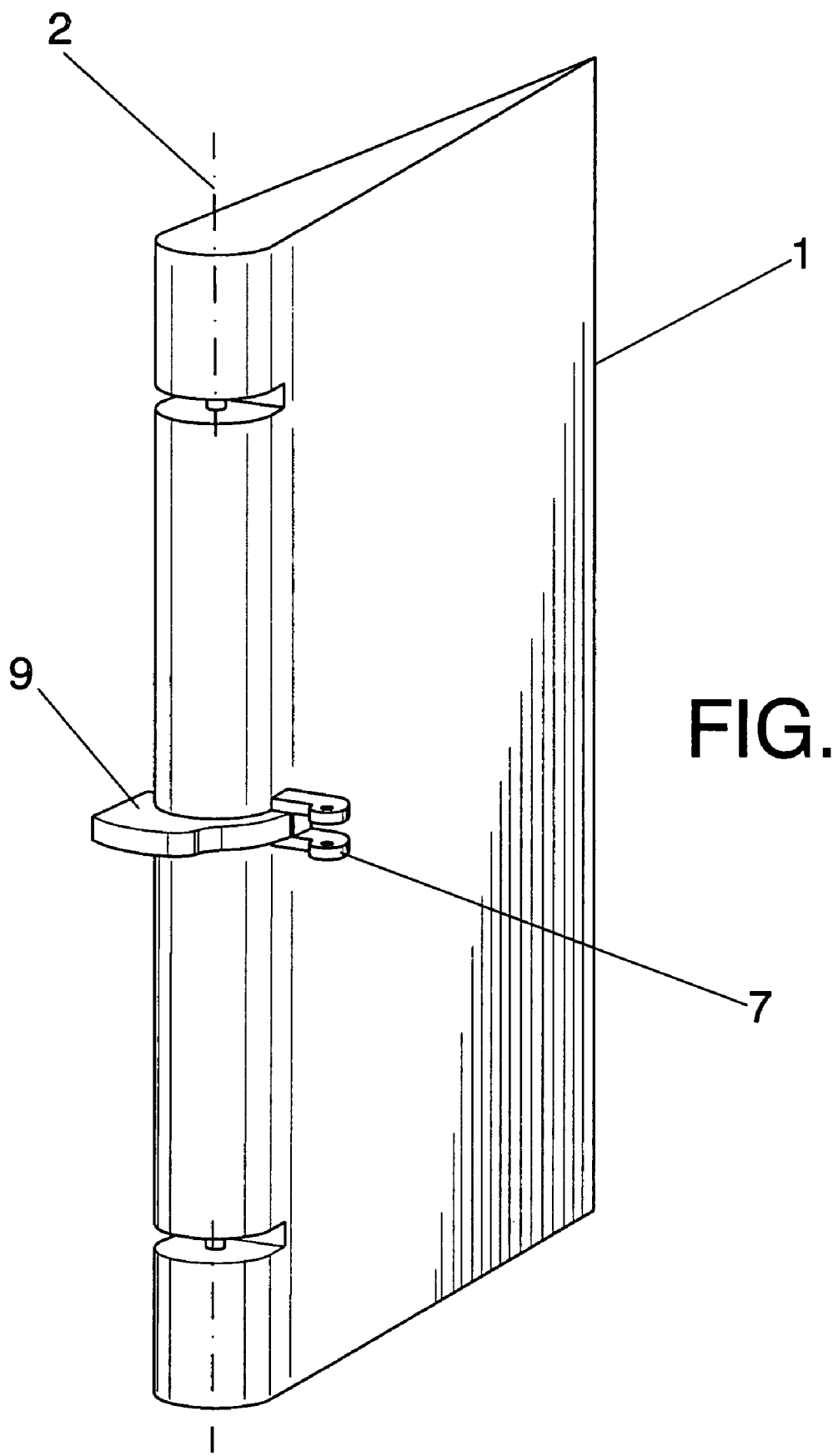
FIG. 3 is a larger scale perspective view of the same rudder as in FIG. 1 in order to clearly show the rotation axis and the iron fittings where the actuator is connected, as well as the position of the cam.

The mechanism (8) is formed by the elastic element (10), materialized in this case by a torsion bar, which is anchored by one of its ends to the disk (11) or the element fixed without the possibility of movement to the fixed part of the structure or stabilizer (4), as seen in FIG. 1. The anchoring point of the torsion bar (10) has a square section for total immobilization of the bar (10). The active or movable end of the torsion bar (10) has the articulated connecting rod (12) or radial lever ending in a fork inserted in order to mount between the branches thereof the following roller (13) of the profile of the cam (9), not represented in FIG. 2 since it corresponds to the rudder (1) since it is integral thereto as shown in FIG. 3.

Reference 14 of FIG. 2 designates the support bearing of the end of the torsion bar (10) in order to control the rotation thereof.

Due to the preloading of the torsion bar (10), or elastic torsional element, the following roller (13) always contacts under pressure the profile or roller track of the cam (9), producing a rotation momentum always of the same sign on the cam, irrespective of whether angular movement of the rudder is produced in one direction or the other.

Figure 4:
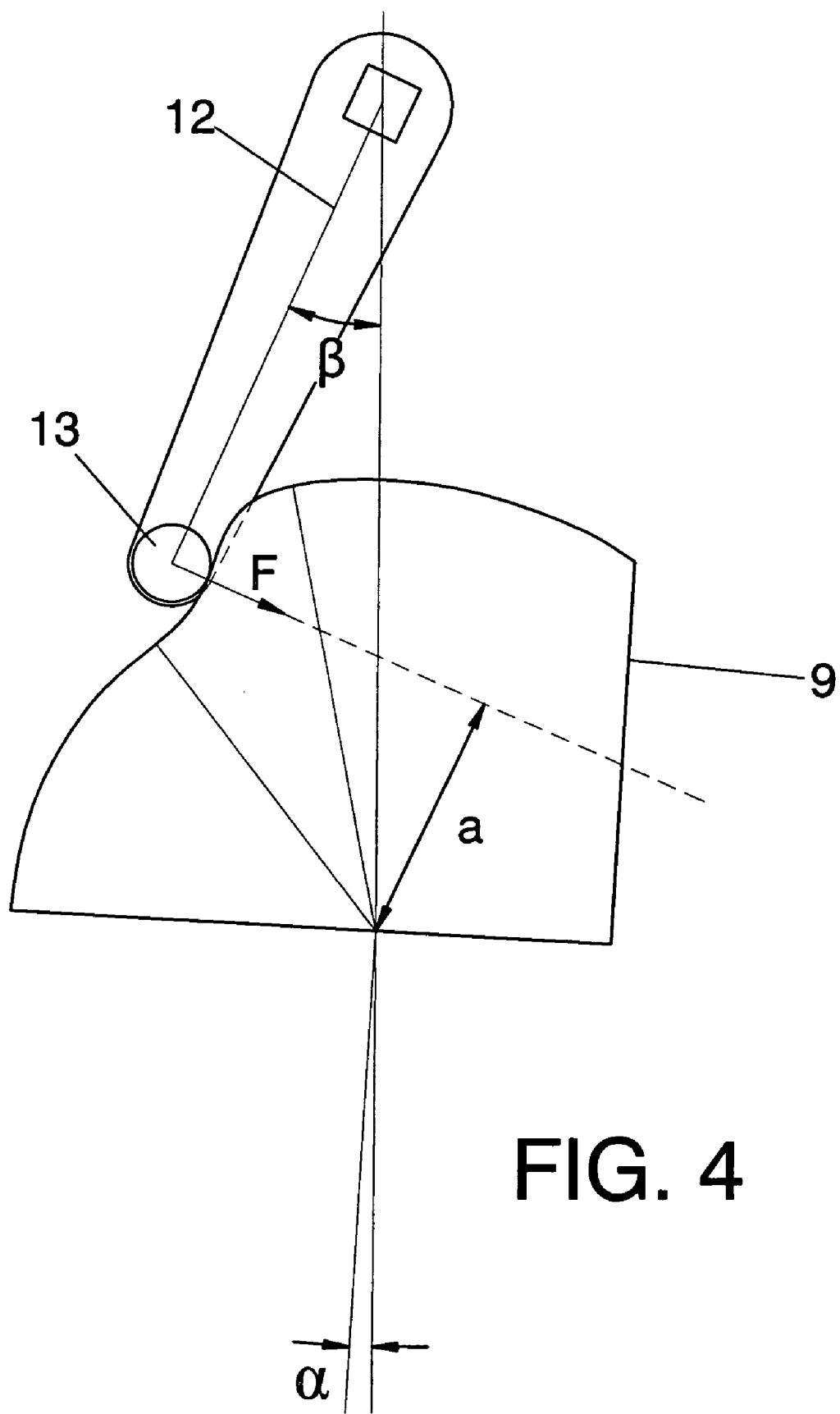
FIG. 4 is a schematic view of the operating of the mechanism object of the invention.

Now analyzing FIG. 4, we can schematically see the operation of the mechanism, obtaining a torque (F×a) on the rudder (12) when the rudder is deflecting an α angle. One can also see that the articulated connecting rod (12) is deviated with a β angle (that will always have the same sign). The cited torque is maximum in the neutral position of the rudder (α=0), being "0" when the following roller (13) reaches the circular sections of the cam (9) profile since the normal one at the tangent point of the roller in these sections passes through the center, or intersection with the rotation axis.

The invention claimed is:

1. Mechanism for eliminating limit cycle oscillations for servocontrolled aerodynamic control surfaces fixed to a structure, equipped with servoactuators and whose supports of the rotation axis or the hinged axis, determine free play due to the manufacturing tolerances and the wear of the bearings or joint elements, wherein said mechanism for eliminating limit cycle oscillations comprises an elastic element, spring or torsion bar, fixed to the structure wherein the control surface is jointed, an articulated rod rigidly connected to a free end of the elastic element, said articulated rod comprising a roller at a free end thereof a cam integral to the control surface, being the roller of the rod a following roller of the cam, in such a way that the following roller permanently contacts the cam, and deviations of the control surface together with the profile of the cam produce continuous nonlinear angular deformation of the elastic element, defining said angular deformation a force torque on the control surface, that reduces when the deviations of the control surface increase, being "0" for positive and negative deviations of the control surface that exceed a pre-established angular value.

2. Mechanism for eliminating limit cycle oscillations according to claim 1 wherein the elastic element is fixed to the structure by means of a disk, being the joining of the elastic element to the disk accomplished by means of an anchoring point having a square section.

3. Mechanism for eliminating limit cycle oscillations according to claim 1, wherein the elastic element is connected to the articulated rod by means of a support bearing and the angular deformation of the elastic element is controlled by said support bearing.

4. Mechanism for eliminating limit cycle oscillations according to claim 2, wherein the elastic element is connected to the articulated rod by means of a support bearing and the angular deformation of the elastic element is controlled by said support bearing.

5. Arrangement of a servocontrolled aerodynamic control surface fixed to a structure, equipped with servoactuators and whose supports of the rotation axis or the hinged axis, determine free play due to the manufacturing tolerances and the wear of the bearings or joint elements, wherein said arrangement of a control surface comprises a mechanism for eliminating limit cycle oscillations, said mechanism for eliminating limit cycle oscillations comprising:

an elastic element, spring or torsion bar, fixed to the structure wherein the control surface is jointed, an articulated rod rigidly connected to a free end of the elastic element, said articulated rod comprising a roller at a free end thereof, and a cam integral to the control surface, being the roller of the rod a following roller of the cam, in such a way that the following roller permanently contacts the cam, and deviations of the control surface together with the profile of the cam produce continuous nonlinear angular deformation of the elastic element, defining said angular deformation a force torque on the control surface, that reduces when the deviations of the control surface increase, being "0" for positive and negative deviations of the control surface that exceed a pre-established angular value.

* * * * *